UNITED STATES PATENT OFFICE.

NEWELL SILL JENKINS, OF DRESDEN, GERMANY.

PLASTIC SOLDERING-PASTE.

No. 846,922.　　　Specification of Letters Patent.　　Patented March 12, 1907.

Application filed June 19, 1906. Serial No. 322,474.

*To all whom it may concern:*

Be it known that I, NEWELL SILL JENKINS, a citizen of the United States of America, and a resident of Struvestrasse 32, Dresden, Kingdom of Saxony, German Empire, have invented a new and useful Plastic Soldering-Paste, of which the following is a specification.

This invention relates to a plastic soldering-paste which is manufactured in the following manner: First reduce a metal—for example, gold or silver—or two or more metals suitable for soldering purposes to a fine powder by precipitation, filing, grinding, or other means. From this fine powder so obtained a paste is then made by mixing with it borax in powdered form or borax in solution, as may be desired, and also a suitable adhesive—as, for example, gum-tragacanth or gum-arabic—and to this paste is added sulfuric or some other acid. This plastic paste or mass so obtained, which may be used for soldering, has the following advantages over all other forms of solder known up to the present:

First. The great advantage that it may be placed or spread in small quantities and without the use of any other material in the exact places to be soldered, even in hollow and obscure corners.

Second. That because of the presence of the adhesive this plastic soldering-paste does not during fusing bubble and increase in volume, and consequently spread beyond the desired limits. On the contrary, this paste flows and solders exactly where it is placed and there only. Therefore no soldering material need be wasted, and the finishing of the soldered parts is made easy.

Third. In using this plastic soldering-paste it is not necessary to clean the parts to be soldered so thoroughly before applying solder as when using other solders, which means again a saving of time and labor.

Fourth. By the addition of sulfuric or some other suitable acid the adhesive is uniformly distributed through the plastic soldering mass, and this uniform distribution is maintained thereby, so as to preserve the plasticity of the soldering-paste indefinitely.

Fifth. Finally the presence of the sulfuric or other suitable acid secures in process of soldering a complete burning out of the gum without the formation of any residuum, even at low fusing temperatures, so that a great technical progress is obtained by the plastic soldering-paste manufactured according to the present invention in face of soldering masses in use up to the present.

What I claim is—

1. A soldering-paste consisting of a suitable soldering metal in a finely reduced or powdered state, borax, an adhesive and an acid.

2. A soldering-paste consisting of a suitable soldering metal in a finely reduced or powdered state, borax, an adhesive and sulfuric acid.

In testimony that I claim the foregoing as my invention I have signed my name, in presence of two witnesses, this 7th day of June, 1906.

NEWELL SILL JENKINS.

Witnesses:
　PAUL E. SCHILLING,
　PAUL ARRAS.